(12) United States Patent
Claypole et al.

(10) Patent No.: US 7,669,558 B2
(45) Date of Patent: Mar. 2, 2010

(54) INTEGRATED VEHICLE COOLING SYSTEM

(75) Inventors: George M. Claypole, Fenton, MI (US); Mark D. Nemesh, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 80 days.

(21) Appl. No.: 11/778,204

(22) Filed: Jul. 16, 2007

(65) Prior Publication Data

US 2009/0020081 A1    Jan. 22, 2009

(51) Int. Cl.
*F01P 3/00*    (2006.01)

(52) U.S. Cl. .................................................. 123/41.51

(58) Field of Classification Search ................ 123/41.1, 123/41.14, 41.29, 41.31, 41.43, 41.51, 41.54; 165/130, 132, 135, 41
See application file for complete search history.

(56) References Cited

U.S. PATENT DOCUMENTS

| | | | | |
|---|---|---|---|---|
| 2,188,172 | A | * | 1/1940 | Brehob ................. 123/196 AB |
| 3,623,462 | A | * | 11/1971 | Anders et al. ............ 123/41.54 |
| 4,061,187 | A | * | 12/1977 | Rajasekaran et al. ... 165/104.31 |
| 4,325,219 | A | * | 4/1982 | Stang et al. .................... 60/599 |
| 4,620,509 | A | * | 11/1986 | Crofts ....................... 123/41.1 |
| 4,893,589 | A | * | 1/1990 | Spinnler ................... 123/41.31 |
| 5,186,245 | A | | 2/1993 | Peters |
| 5,353,757 | A | * | 10/1994 | Susa et al. ............... 123/41.29 |
| 5,526,873 | A | * | 6/1996 | Marsais et al. ................. 165/51 |
| 6,173,766 | B1 | * | 1/2001 | Nakamura et al. .......... 165/176 |
| 6,196,168 | B1 | * | 3/2001 | Eckerskorn et al. ....... 123/41.33 |
| 6,394,176 | B1 | * | 5/2002 | Marsais ...................... 165/140 |
| 6,405,688 | B1 | * | 6/2002 | Dahm et al. ................ 123/41.1 |
| 6,470,961 | B1 | | 10/2002 | Case |
| 6,789,613 | B1 | * | 9/2004 | Ozaki et al. .................. 165/140 |
| 6,938,675 | B2 | * | 9/2005 | Kokubunji et al. ......... 165/11.1 |
| 7,111,669 | B2 | * | 9/2006 | Hoglinger et al. ........... 165/140 |
| 7,210,522 | B2 | * | 5/2007 | Gruian ....................... 165/202 |
| 7,261,069 | B2 | * | 8/2007 | Gunther .................... 123/41.54 |
| 7,284,594 | B2 | * | 10/2007 | Sanada et al. ................. 165/41 |
| 7,322,399 | B2 | * | 1/2008 | Guerrero et al. ............. 165/101 |
| 7,337,832 | B2 | * | 3/2008 | Hu .............................. 165/140 |
| 7,406,929 | B2 | * | 8/2008 | Hassdenteufel et al. .... 123/41.1 |
| 2007/0074682 | A1 | * | 4/2007 | Makuta ...................... 123/41.1 |

OTHER PUBLICATIONS

U.S. Appl. No. 11/674,190, filed Feb. 13, 2007 of George M. Claypole et al.
Lexus 400h Service Manual, Section on Cooling System for inverter, MG1 and MG2, of Toyota Motor Corporation, Toyota City, Japan, 3 pages (2006—similar to Toyota Prius 2004).

* cited by examiner

*Primary Examiner*—Hai H Huynh (57) ABSTRACT

An integrated high and moderate temperature cooling system both for an internal combustion engine and for auxiliary vehicle components requiring cooling. The integrated cooling system shares a coolant, yet the shared coolant is stratified to retain thermal identity between the portion of the coolant used for engine cooling and the portion of the coolant used for auxiliary vehicle components cooling. A shared coolant reservoir is used; preferably a shared heat exchanger, and optionally a common coolant pump may also be used.

5 Claims, 9 Drawing Sheets

INTEGRATED VEHICLE COOLING SYSTEM

TECHNICAL FIELD

The present invention relates to high temperature (i.e., fast flow rate) cooling systems of the type used to cool internal combustion engines and further relates to moderate temperature (i.e., low flow rate) cooling systems of the type used to cool vehicle electronics, as for example those associated with hybrid and fuel cell motor vehicles. Still more particularly, the present invention relates to an integrated vehicle cooling system in which components of the high and moderate temperature cooling systems are shared.

BACKGROUND OF THE INVENTION

Figure 1A:
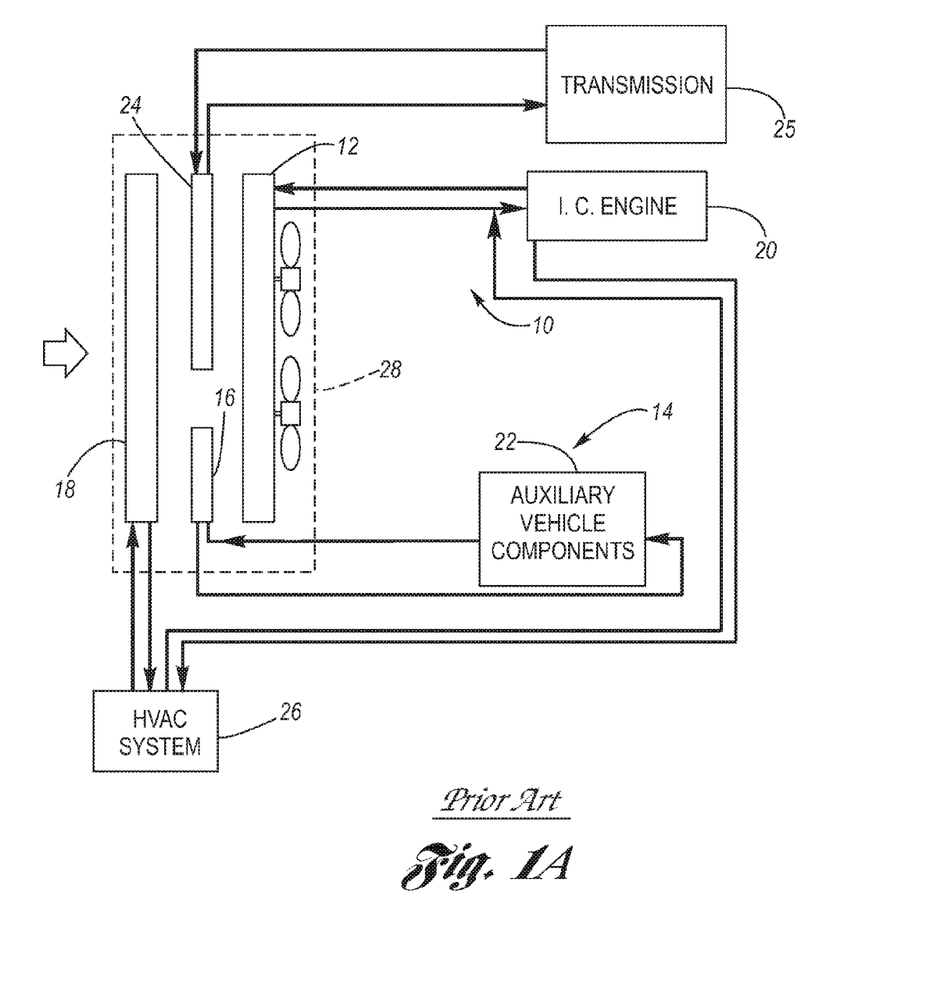
FIG. 1A is a schematic diagram of conventional, prior art high and moderate temperature cooling systems of a motor vehicle.

As for example shown at FIG. 1A, a prior art motor vehicle has a high temperature, fast flow rate, cooling system 10 for cooling the internal combustion engine 20 via engine coolant heat exchange with the atmosphere at an engine heat exchanger (radiator) 12, and further has a moderate (low to middle-range) temperature, low flow rate, cooling system 14 for cooling of auxiliary vehicle components 22, as for example vehicle hybrid electronics, engine turbo/super chargers, etc., via auxiliary coolant heat exchange with the atmosphere at an auxiliary heat exchanger (radiator) 16.

It is conventional practice to include the engine heat exchanger 12 and a condenser 18 of the heating, ventilation, air conditioning (HVAC) system 26 of the motor vehicle into a condenser, radiator and fan module (CRFM) assembly 28, as for example described in U.S. Pat. No. 6,470,961, wherein, when present, the auxiliary heat exchanger 16 is also included in the CRFM assembly, as shown at FIG. 1A.

Motor vehicle applications of the moderate temperature cooling system 14 include, for example, hybrid motor vehicles and fuel cell motor vehicles. Hybrid motor vehicles utilize electrical components which supplement the internal combustion engine, as for example a power inverter and/or an electric drive motor, and other electrical components. Problematically, these electrical components generate heat which must be dissipated in order to operate within predetermined parameters. As such, a moderate temperature coolant system 14 is used to provide the heat dissipation, as needed. Fuel cell motor vehicles may also utilize a moderate temperature cooling system 14 for its electronic components, i.e., cooling of power inverters, electric drive motors, etc. Also, a moderate temperature cooling system 14 may be used with air-to-coolant charge air coolers, as for example either turbo-charged or supercharged powertrains. The high and moderate temperature cooling systems 10, 14 are entirely separate from each other in terms of components, coolant and functionality.

Figure 1B:
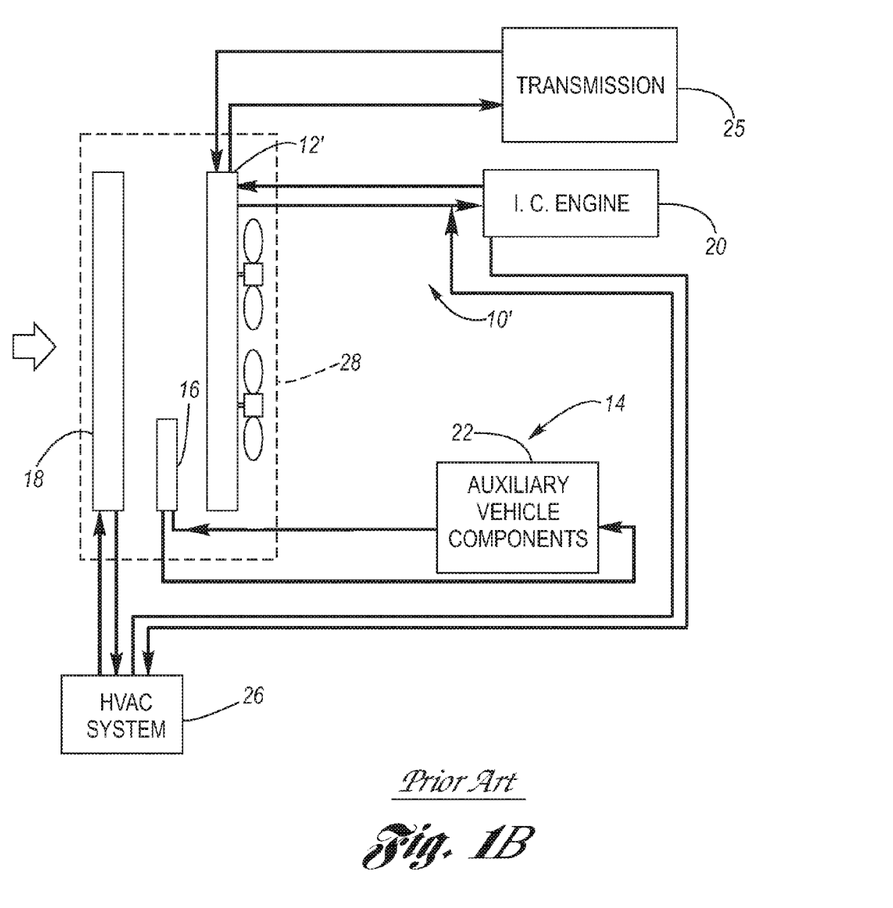
FIG. 1B is a schematic diagram showing a first variant of the conventional, prior art high and moderate temperature cooling systems of FIG. 1A.
Figure 1C:
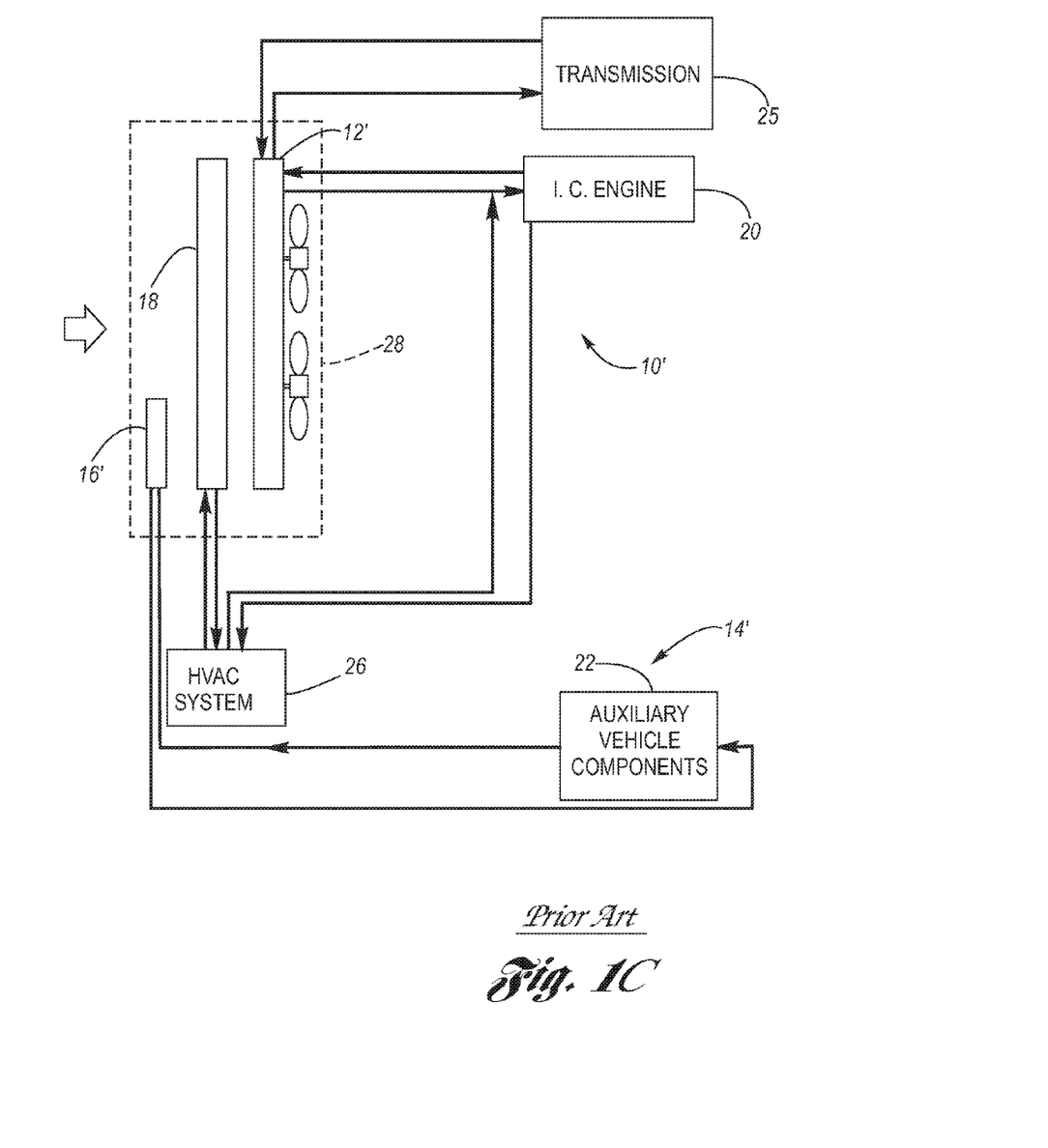
FIG. 1C is a schematic diagram showing a second variant of the conventional, prior art high and moderate temperature cooling systems of FIG. 1A.

FIGS. 1B and 1C depict variations on the configuration of FIG. 1A, wherein like functioning parts have like numeral designations. In FIG. 1B, the high temperature cooling system 10' is modified so that the fluid of the transmission 25 is cooled by incorporation with the engine heat exchanger 12', as for example described in U.S. Pat. No. 5,186,245. In FIG. 1C, the configuration of FIG. 1B is modified further, in that the moderate temperature cooling system 14' now has an anterior relocation of the auxiliary heat exchanger 16'.

Figure 1D:
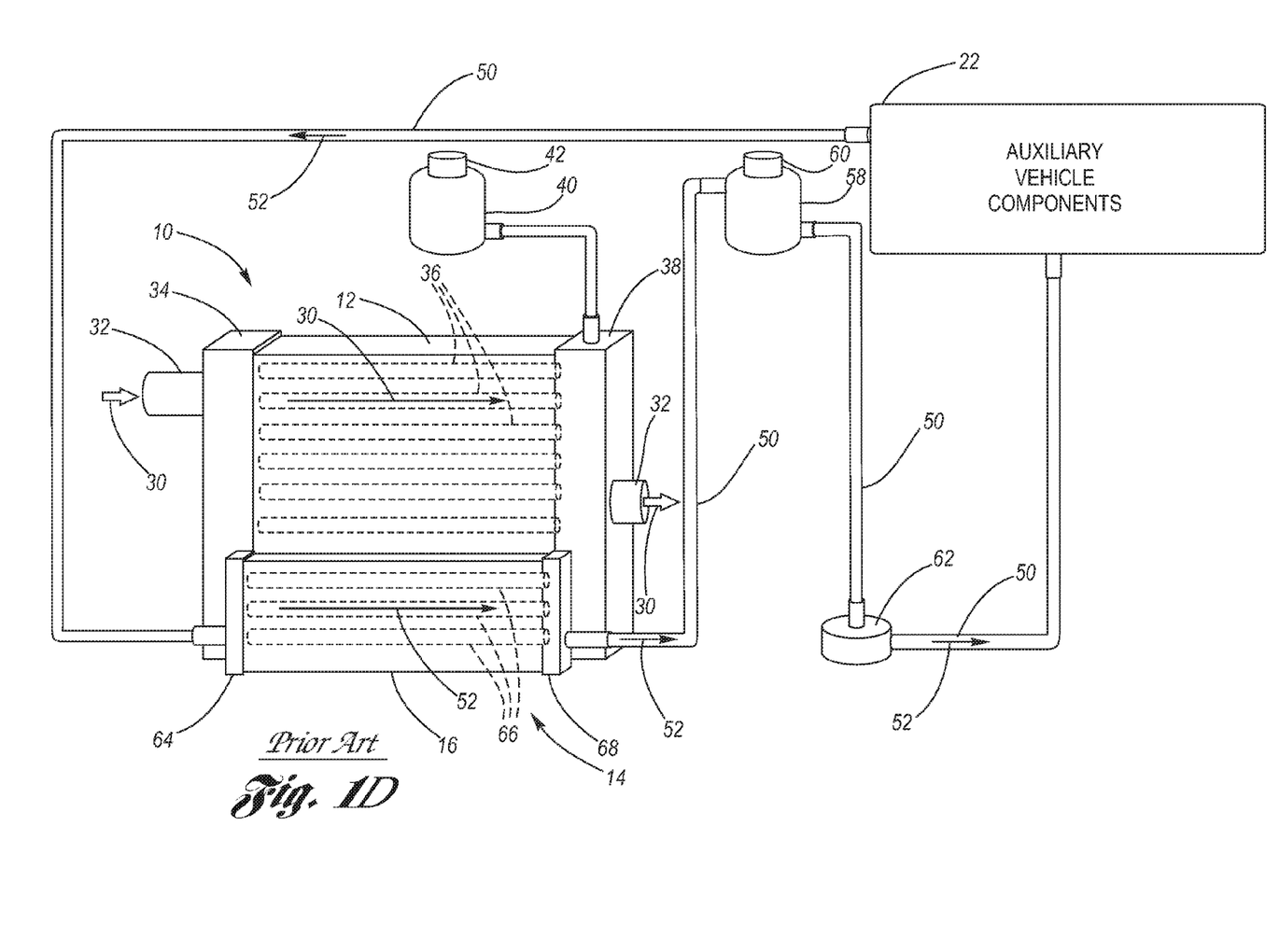
FIG. 1D is a schematic diagram of conventional, prior art high and moderate temperature cooling systems of a motor vehicle, showing in particular the heat exchangers thereof.

Referring now additionally to FIG. 1D, additional details of the prior art high and moderate temperature cooling systems 10, 14 will be further discussed.

The high temperature cooling system 10 circulates an engine coolant 30, which is hot leaving the engine, through main coolant piping 32 to the engine heat exchanger (radiator) 12 where it is cooled, and then returns to the engine, wherein this circulation is provided by a water pump. The flow of engine coolant 30 is regulated by a thermostat, wherein the engine coolant typically has an operational temperature range of between 80 C and 127 C entering the engine heat exchanger and an operational temperature range of between 60 C and 120 C leaving the engine heat exchanger. No engine coolant flows in the event the thermostat is closed or when the internal combustion engine is turned off. The components of the high temperature coolant system 10 further include: an engine heat exchanger inlet tank 34 connected to engine heat exchanger passages 36 of the engine heat exchanger 12, an engine heat exchanger outlet tank 38 also connected to the engine heat exchanger passages, and an engine coolant reservoir 40 communicating with the engine heat exchanger outlet tank and having a pressure relief fill port 42.

The moderate temperature cooling system 14 includes auxiliary coolant piping 50, whereby an auxiliary coolant 52 flows through the auxiliary heat exchanger (radiator) 16 whereat heat of the coolant is exchanged with the atmosphere, and whereby heat is absorbed from various auxiliary vehicle components 22 which may be connected in series, parallel or series-parallel with respect to each other, and may include, for example traction power electronics, motors, accessory power supplies, alternators, engine turbo/super chargers, intercoolers, oil coolers (other than engine and transmission), etc. The auxiliary coolant 52 is fluidically connected to an auxiliary coolant reservoir (or surge tank) 58 which serves as a coolant flow-through in which a removable pressure relief cap 60 permits air escape and whereat auxiliary coolant filling is performed. A pump 62 powered by an electric motor is connected by the auxiliary coolant piping, wherein the inlet of the pump is connected to the auxiliary coolant reservoir 58 (which is, in turn, connected to an outlet side of the auxiliary heat exchanger 16), and the outlet of the pump is connected to the auxiliary vehicle components 22 (which are, in turn, connected to an inlet side of the auxiliary heat exchanger). The flow of auxiliary coolant typically has an operational temperature range of between 60° C. and 95° C. entering the auxiliary coolant heat exchanger and an operational temperature range of between 55° C. and 90° C. leaving the auxiliary coolant heat exchanger. The auxiliary coolant flows irrespective of flow of the engine coolant, as it is a separate system. The components of the moderate temperature coolant system 14 include: an auxiliary heat exchanger inlet tank 64 connected with auxiliary heat exchanger passages 66 of the auxiliary heat exchanger and an auxiliary heat exchanger outlet tank 68 also connected to the auxiliary heat exchanger passages.

With the addition of alternative power systems such as electric hybrid propulsion and the need for improved emissions and performance while simultaneously increasing fuel economy by adding enhancements such as forced engine induction, the moderate temperature cooling system 14 adds to the vehicle packaging, mass and cost burden. To be effective, the moderate temperature cooling system 14 requires auxiliary coolant temperatures that peak and average differently than that of engines and transmissions. Due to the amount of heat that is rejected by the typical engine, it is usually impractical to resize the engine thermal system to provide the temperature headroom required by the moderate temperature cooling system.

Accordingly, what remains needed in the art is an integrated high and moderate temperature cooling system for both the internal combustion engine and the auxiliary components of the motor vehicle that successfully addresses the aforementioned issues.

SUMMARY OF THE INVENTION

The present invention is an integrated high and moderate temperature cooling system both for the internal combustion engine (including the transmission) and for the auxiliary components of the motor vehicle, wherein the integration successfully accommodates the inherent thermal differences therebetween, reduces the vehicle cost burden and packaging, and provides the levels of cooling performance desired of the high and moderate cooling systems, respectively.

The integrated cooling system according to the present invention is characterized by selection of a mechanical configuration of the high and moderate temperature cooling systems so that the coolant is shared, whereby the coolant temperature is stratified such that there is thermal identity between the portion of the coolant used for engine cooling (the engine coolant portion) and the portion of the coolant used for auxiliary vehicle components cooling (the auxiliary coolant portion).

A number of application embodiments of the integrated cooling system are possible, including the following embodiments presented merely for illustrative, nonlimiting purposes. A first application embodiment has the piping arranged such that the coolant reservoir, air separation and coolant fill are all shared. A second application embodiment has a shared coolant reservoir and further has a shared heat exchanger including shared inlet and outlet tanks, wherein the shared inlet tank has an internal baffle which separates the incoming auxiliary coolant portion from the incoming engine coolant portion. A third application embodiment is similar to the second embodiment, except now the coolant reservoir, air separation and coolant fill is all at the outlet tank. Finally, a fourth application embodiment is similar to the third embodiment, except now the shared coolant is circulated by a shared pump. It is to be understood that these embodiments are not exhaustive of embodiments which can achieve shared coolant which is stratified so as to retain thermal identity of the engine coolant portion thereof as per the hot temperature cooling needed for, and used at, the engine, and simultaneously retain the thermal identity of the auxiliary coolant portion thereof as per the moderate temperature cooling needed for, and used at, the auxiliary vehicle components.

Thus, it is seen that the integrated cooling system according to the present invention provides two or more thermal system coolant temperatures obtained from one shared coolant cooling system, wherein the shared coolant is thermally stratified as between a high temperature cooling subsystem and a moderate temperature cooling subsystem. An advantageous benefit of the integrated cooling system according to the present invention is provided by the use of a single, shared heat exchanger for the high and moderate temperature cooling subsystems of the integrated cooling system (as opposed to the prior art practice of having separate, parallel or series heat exchangers for each of the high and moderate cooling systems). To compensate for the additional heat load on a single, shared heat exchanger due to the high and moderate temperature cooling systems integration, the shared heat exchanger has to be sized upwardly by the percentage of capacity that is additionally assigned to the thermal load of the auxiliary vehicle components. In most cases, this new thermal load is, in absolute terms, minor compared to the engine and transmission thermal load, so that it is the providing of an integrated cooling system which yet provides for differing required coolant temperatures that is the major problem solved by the present invention.

Accordingly, it is an object of the present invention to provide an integrated high and moderate temperature cooling system for both the internal combustion engine (including the transmission) and the auxiliary components of the motor vehicle, wherein the integration successfully accommodates the inherent thermal differences therebetween, reduces the vehicle cost burden and packaging, and provides the levels of cooling performance desired of the high and moderate cooling systems, respectively.

This and additional objects, features and advantages of the present invention will become clearer from the following specification of a preferred embodiment.

DESCRIPTION OF THE PREFERRED EMBODIMENT

Referring now to the Drawing, FIGS. 2A through 6 depict various structural and functional aspects of an integrated cooling system for a motor vehicle according to the present invention.

Figure 2A:
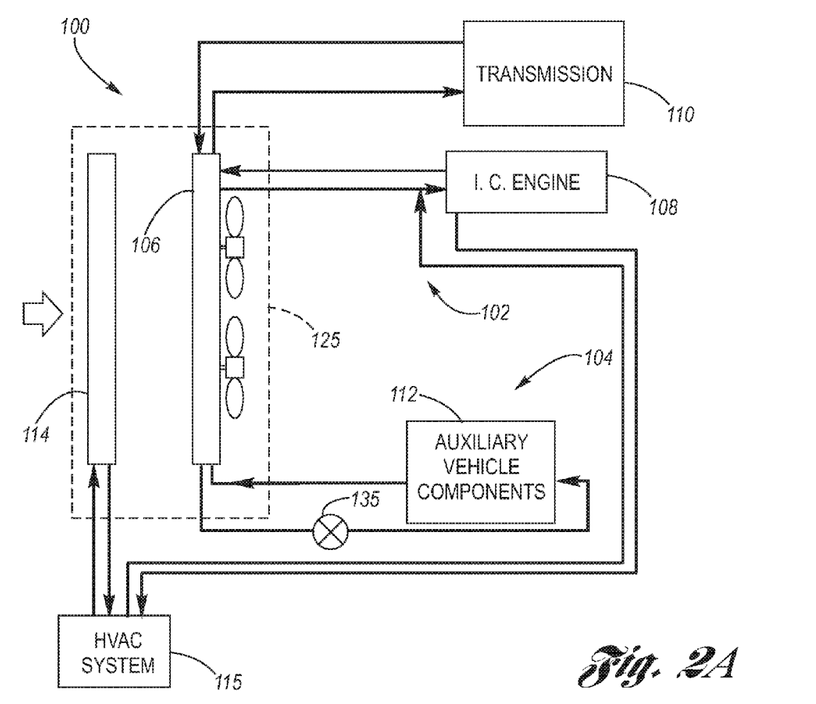
FIG. 2A is a general overview schematic diagram of an integrated cooling system for a motor vehicle according to the present invention.
Figure 2B:
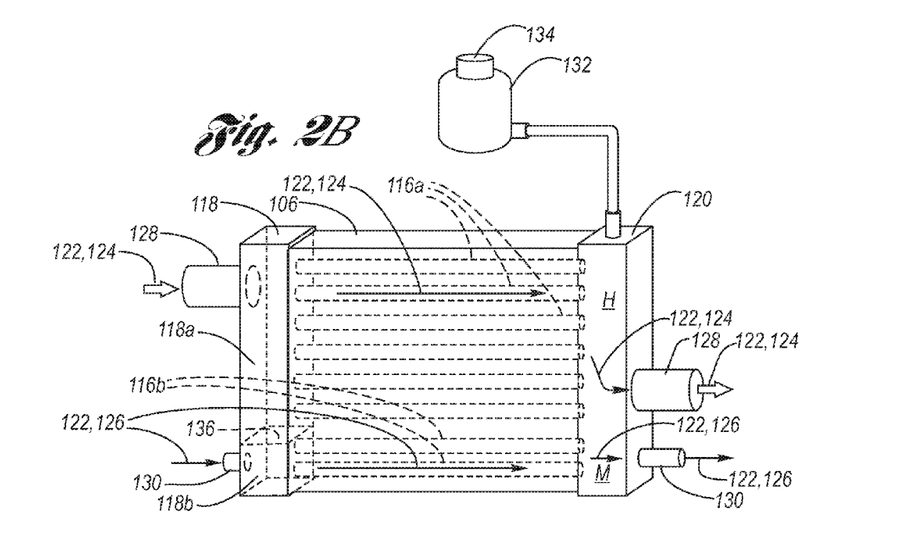
FIG. 2B is a general overview schematic diagram of an integrated cooling system for a motor vehicle according to the present invention, now showing in more particular the shared heat exchanger thereof.

Turning attention firstly to FIGS. 2A and 2B, an overview of the general aspects of an integrated cooling system 100 according to the present invention is depicted.

Figure 6:
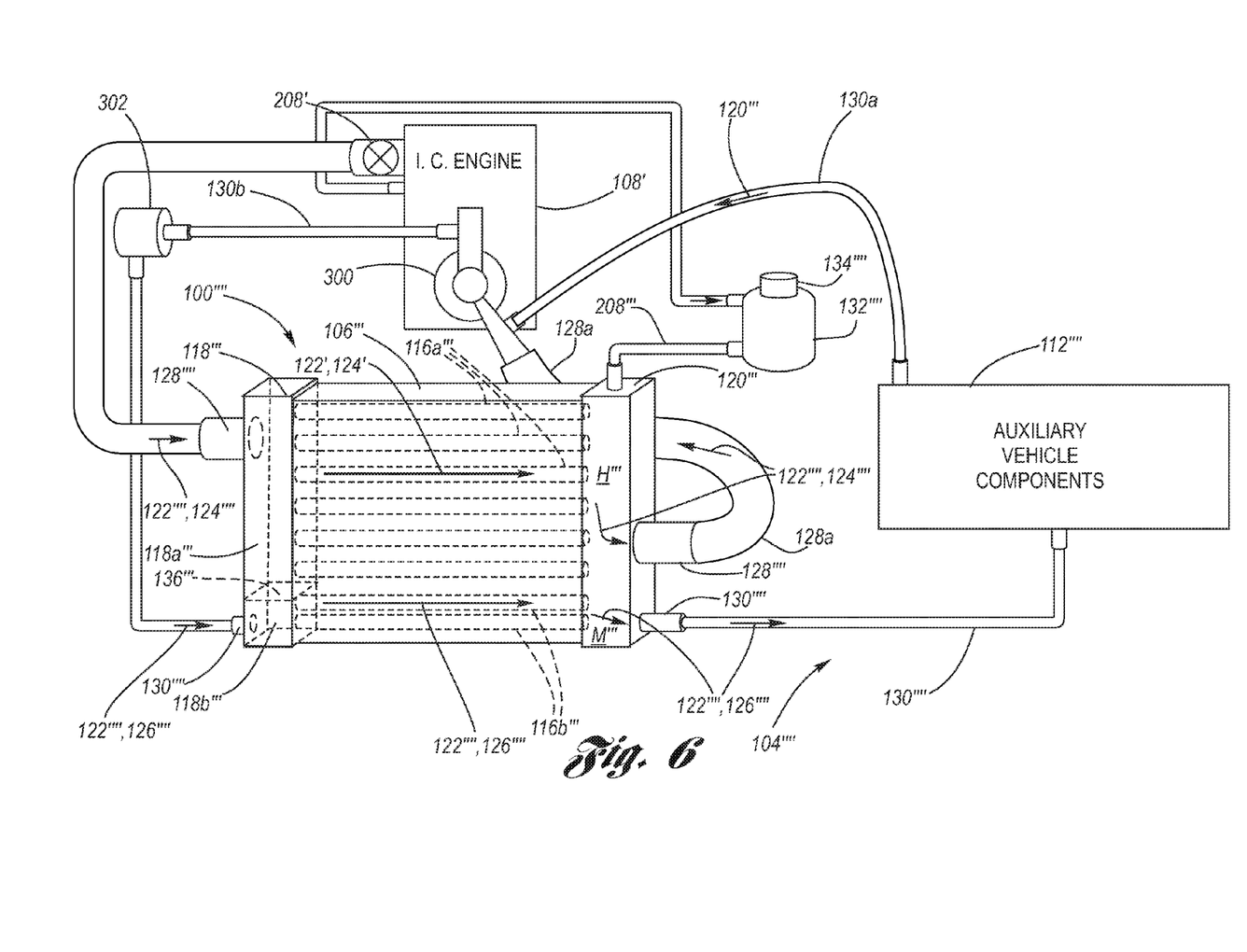
FIG. 6 is a schematic diagram of an integrated cooling system for a motor vehicle according to a fourth preferred application embodiment of the present invention.

As shown at FIG. 2A, the integrated cooling system 100 provides shared coolant via piping with respect to a shared heat exchanger 106. The shared coolant is stratified so as to retain thermal identity as between an engine coolant portion and an auxiliary coolant portion thereof (i.e., each retains its own thermal identity). The engine coolant portion of the shared coolant is utilized in a hot temperature cooling subsystem 102 of the integrated cooling system 100 which is needed for, and used at, the engine 108 and, if desired also the transmission 110. The auxiliary coolant portion of the shared coolant is utilized in a moderate temperature cooling subsystem 104 of the integrated cooling system 100 which is needed for, and used at, the auxiliary vehicle components 112. The HVAC system 115 utilizes a condenser 114 for its air conditioning component and has a connection to the shared heat exchanger 106 for its heater component. Preferably the fans, shared heat exchanger 106 and the condenser 114 are packaged as a CRFM assembly 125. The engine coolant portion 124 is circulated by a water pump (not shown) and the auxiliary coolant portion 126 is circulated by an electric pump 135, but, as can be seen at FIG. 6, circulation pumping may be shared.

As indicated further by FIG. 2B, the shared heat exchanger 106 has coolant passages 116a, 116b connecting between an inlet tank 118 and an outlet tank 120. The shared coolant 122 is composed, as mentioned, of an engine coolant portion 124 and an auxiliary coolant portion 126. Engine coolant piping 128 is connected to the inlet and outlet tanks 118, 120 and an auxiliary coolant piping 130 is also connected to the inlet and outlet tanks, at respective connections located beneath (i.e., gravitationally lower than) the connections of the engine coolant piping. A common coolant reservoir 132 provides a shared air release at a shared coolant pressure relief filler cap 134, the common coolant reservoir being interfaced with the outlet tank 120. The inlet tank 118 has an internal baffle 136 which separates the inlet tank 118 into a first inlet tank portion 118a and a second inlet tank portion 118b. The baffle 136 prevents mutual mixing in the inlet tank 118 of the engine and auxiliary coolant portions 124, 126 of the shared coolant 122, in that the coolant passages 116a for the engine coolant portion 124 are split with respect to the coolant passages 116b for the auxiliary coolant portion 126, whereby coolant stratification is provided at the shared heat exchanger 106 with respect to the incoming engine coolant portion and the incoming auxiliary coolant portion.

This coolant stratification continues through the coolant passages 116a, 116b, and while the shared coolant 122 is, in theory, able to mix within the outlet tank 120, in practice, the coolant stratification continues as between the engine coolant portion 124 and the auxiliary coolant portion 126 due to a temperature gradient thereinside with respect to a hot temperature region H and a moderate temperature region M.

From the foregoing descriptive overview of the integrated cooling system 100, several aspects thereof are notable. The inlet tank 118 is split by the baffle 136, thereby stratifying the shared coolant 122 by preventing thermal mixing of the engine coolant portion 124 with respect to the auxiliary coolant portion 126, and isolating the hot and moderate cooling subsystems (see 102, 104 of FIG. 2A). The outlet tank 120 has no baffle, being interiorly unobstructed, which provides for a single assembly operation involving the shared coolant evacuation and fill, and further provides an air separator for the auxiliary coolant portion. Finally, because the lower portion of the shared heat exchanger 106 is dedicated to the auxiliary coolant portion, due to the presence of the baffle in the inlet tank, the outlet tank provides a vertical head for the moderate temperature cooling subsystem which serves to improve its electric pump pressure rise capability of its electric pump.

Referring now additionally to FIGS. 3 through 6, various application embodiments of the integrated cooling system according to the present invention will be described, wherein it is to be understood that these are merely for purposes of illustration, and not limitation, and wherein like functioning parts as among FIG. 2A through FIG. 6 will be carried forward with like numeral designations with progressive priming.

Figure 3:
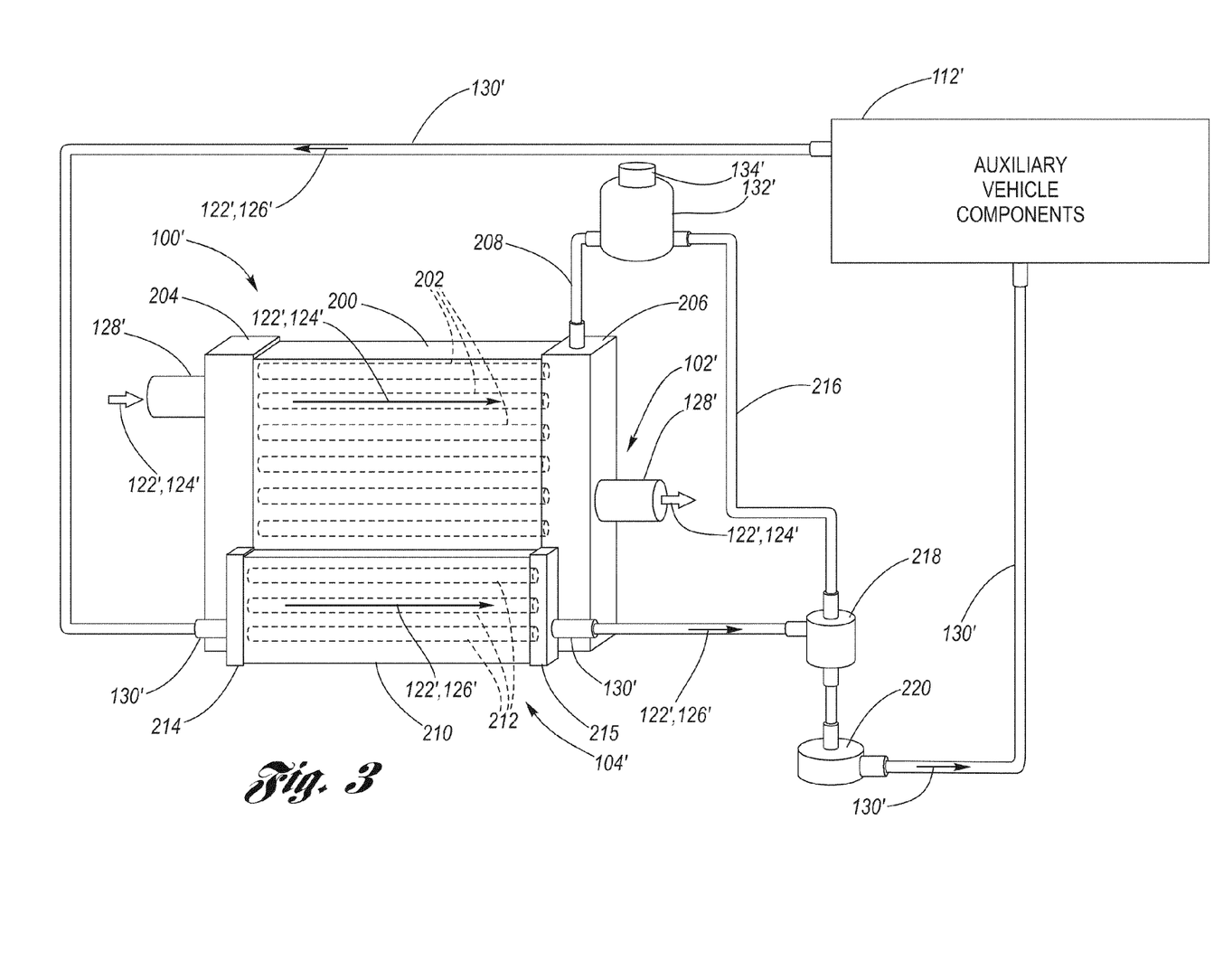
FIG. 3 is a schematic diagram of an integrated cooling system for a motor vehicle according to a first preferred application embodiment of the present invention.

Referring additionally now to FIG. 3, a first application embodiment 100' of the integrated cooling system according to the present invention is depicted.

The shared coolant 122' is composed, as mentioned, of an engine coolant portion 124' and an auxiliary coolant portion 126'. The shared coolant 122' is provided by a shared coolant reservoir 132' with respect to each of the high and moderate temperature cooling subsystems 102', 104', whereat the pressure relief filler cap 134' thereof provides shared coolant fill and shared air escape; otherwise, the high and moderate temperature cooling systems are separate.

The high temperature cooling system 102' has its own engine heat exchanger 200 having coolant passages 202 running between engine heat exchanger inlet and outlet tanks 204, 206, each of which connecting to engine coolant piping 128', and wherein the shared coolant reservoir 132' has a first coolant pipe 208 which connects to the engine heat exchanger outlet tank 206.

The moderate temperature cooling system 104' 102' has its own auxiliary heat exchanger 210 having coolant passages 212 running between auxiliary heat exchanger inlet and outlet tanks 214, 215, each of which connecting to auxiliary coolant piping 130', and wherein the shared coolant reservoir 132' has a second coolant pipe 216 which connects to the auxiliary coolant piping, preferably at an air separator 218, wherein the air separator is preferably of the type disclosed in U.S. patent application Ser. No. 11/674,190, filed on Feb. 13, 2007, the disclosure of which is hereby herein incorporated by reference. The auxiliary coolant portion 126' of the moderate temperature cooling subsystem 104' is circulated by an electric pump 220, whereas the engine coolant portion 124' of the high temperature cooling subsystem 102' is circulated by the engine water pump (not shown).

In that there is a separate engine heat exchanger 200 and a separate auxiliary heat exchanger 210, coolant stratification is inherently provided at the respective engine and auxiliary heat exchangers with respect to the incoming engine coolant portion 124' and the incoming auxiliary coolant portion 126'.

Figure 4:
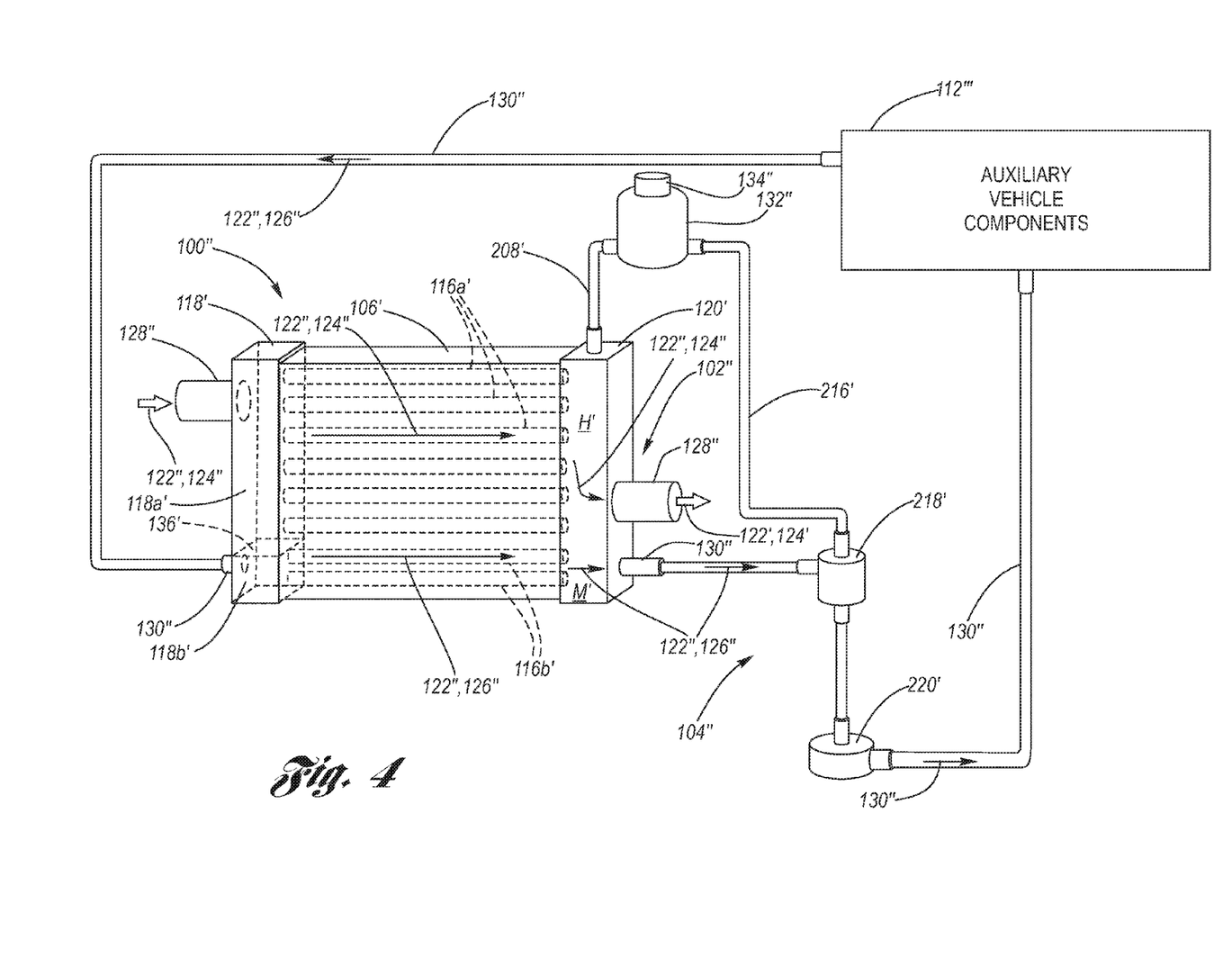
FIG. 4 is a schematic diagram of an integrated cooling system for a motor vehicle according to a second preferred application embodiment of the present invention.

Referring further to FIG. 4, a second application embodiment 100" of the integrated cooling system according to the present invention is depicted.

The shared coolant 122" is composed, as mentioned, of an engine coolant portion 124" and an auxiliary coolant portion 126". The shared coolant 122" is provided by a shared coolant reservoir 132" with respect to each of the high and moderate temperature cooling subsystems 102", 104", whereat the pressure relief filler cap 134" thereof provides shared coolant fill and shared air escape; additionally, a shared heat exchanger 106' is utilized. The shared heat exchanger 106' has coolant passages 116a', 116b' connecting between an inlet tank 118' and an outlet tank 120'. The shared coolant reservoir 132" has a first coolant pipe 208' which connects to the outlet tank 120'.

Engine coolant piping 128' is connected to the inlet and outlet tanks 118', 120' and an auxiliary coolant piping 130' is also connected to the inlet and outlet tanks, at respective connections located beneath (i.e., gravitationally lower than) the connections of the engine coolant piping. The inlet tank 118' has an internal baffle 136' which separates the inlet tank 118' into a first inlet tank portion 118a' and a second inlet tank portion 118b'. The baffle 136' prevents mutual mixing in the inlet tank 118' of the engine and auxiliary coolant portions 124', 126' of the shared coolant 122', as described above, whereby coolant stratification is provided at the shared heat exchanger 106' with respect to the incoming engine coolant portion and the incoming auxiliary coolant portion.

This coolant stratification continues through the coolant passages 116*a*', 116*b*', and while the shared coolant 122' is, in theory, able to mix within the outlet tank 120', in practice, the coolant stratification continues as between the engine coolant portion 124' and the auxiliary coolant portion 126' due to a temperature gradient thereinside with respect to a hot temperature region H' and a moderate temperature region M'.

The shared coolant reservoir 132" has a second coolant pipe 216' which connects to the auxiliary coolant piping 130", preferably at an air separator 218', wherein the air separator is preferably of the type disclosed in the aforesaid incorporated by reference U.S. patent application. The auxiliary coolant portion 126" of the moderate temperature cooling subsystem 104" is circulated by an electric pump 220', whereas the engine coolant portion 124" of the high temperature cooling subsystem 102" is circulated by the engine water pump (not shown).

Figure 5:
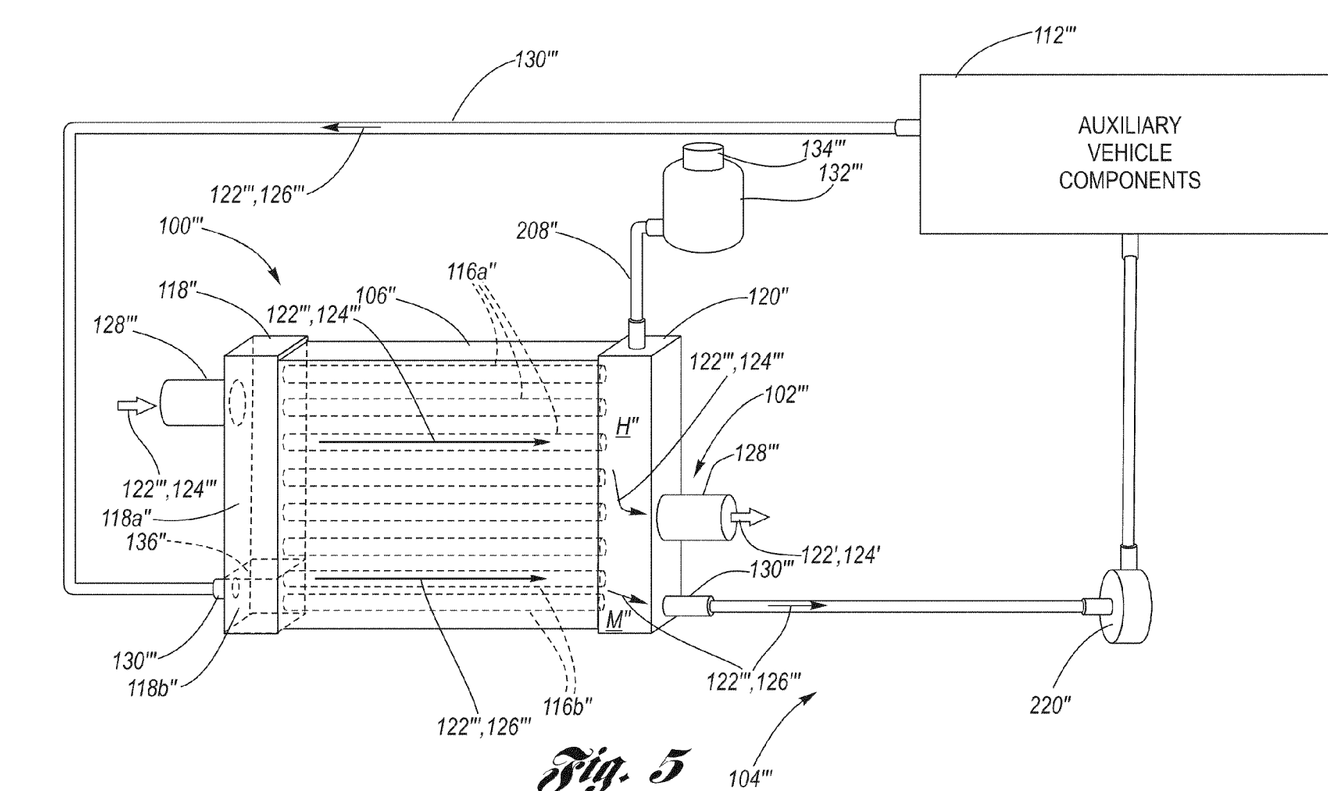
FIG. 5 is a schematic diagram of an integrated cooling system for a motor vehicle according to a third preferred application embodiment of the present invention.

Referring additionally now to FIG. 5, a third application embodiment 100''' of the integrated cooling system according to the present invention is depicted.

The shared coolant 122''' is composed, as mentioned, of an engine coolant portion 124''' and an auxiliary coolant portion 126'''. The shared coolant 122''' is provided by a shared coolant reservoir 132''' with respect to each of the high and moderate temperature cooling subsystems 102''', 104''', whereat the pressure relief filler cap 134''' thereof provides shared coolant fill and shared air escape; additionally, a shared heat exchanger 106" is utilized. The shared heat exchanger 106" has coolant passages 116*a*", 116*b*" connecting between an inlet tank 118" and an outlet tank 120". The shared coolant reservoir 132''' has a single coolant pipe 208" which connects to the outlet tank 120".

Engine coolant piping 128''' is connected to the inlet and outlet tanks 118", 120" and an auxiliary coolant piping 130''' is also connected to the inlet and outlet tanks, at respective connections located beneath (i.e., gravitationally lower than) the connections of the engine coolant piping. The inlet tank 118" has an internal baffle 136" which separates the inlet tank 118" into a first inlet tank portion 118*a*" and a second inlet tank portion 118*b*". The baffle 136" prevents mutual mixing in the inlet tank 118" of the engine and auxiliary coolant portions 124", 126" of the shared coolant 122", as described above, whereby coolant stratification is provided at the shared heat exchanger 106" with respect to the incoming engine coolant portion and the incoming auxiliary coolant portion.

This coolant stratification continues through the coolant passages 116*a*", 116*b*", and while the shared coolant 122" is, in theory, able to mix within the outlet tank 120", in practice, the coolant stratification continues as between the engine coolant portion 124" and the auxiliary coolant portion 126" due to a temperature gradient thereinside with respect to a hot temperature region H" and a moderate temperature region M". The auxiliary coolant portion 126''' of the moderate temperature cooling subsystem 104''' is circulated by an electric pump 220", whereas the engine coolant portion 124''' of the high temperature cooling subsystem 102''' is circulated by the engine water pump (not shown).

Turning attention now further to FIG. 6, a fourth application embodiment 100"" of the integrated cooling system according to the present invention is depicted.

The shared coolant 122"" is composed, as mentioned, of an engine coolant portion 124"" and an auxiliary coolant portion 126"". The shared coolant 122"" is provided by a shared coolant reservoir 132"" with respect to each of the high and moderate temperature cooling subsystems 102"", 104"", whereat the pressure relief filler cap 134"" thereof provides shared coolant fill and shared air escape; additionally, a shared heat exchanger 106''' and a shared coolant pump 300 are utilized.

The shared heat exchanger 106''' has coolant passages 116*a*''', 116*b*''' connecting between an inlet tank 118''' and an outlet tank 120'''. The shared coolant reservoir 132"" has a single coolant pipe 208''' which connects to the outlet tank 120'''.

Engine coolant piping 128"" is connected to the inlet and outlet tanks 118''', 120''' and an auxiliary coolant piping 130"" is also connected to the inlet and outlet tanks, at respective connections located beneath (i.e., gravitationally lower than) the connections of the engine coolant piping. The inlet tank 118''' has an internal baffle 136''' which separates the inlet tank 118''' into a first inlet tank portion 118*a*''' and a second inlet tank portion 118*b*'''. The baffle 136''' prevents mutual mixing in the inlet tank 118''' of the engine and auxiliary coolant portions 124"", 126"" of the shared coolant 122"", as described above, whereby coolant stratification is provided at the shared heat exchanger 106''' with respect to the incoming engine coolant portion and the incoming auxiliary coolant portion.

This coolant stratification continues through the coolant passages 116*a*''', 116*b*''', and while the shared coolant 122"" is, in theory, able to mix within the outlet tank 120''', in practice, the coolant stratification continues as between the engine coolant portion 124"" and the auxiliary coolant portion 126"" due to a temperature gradient thereinside with respect to a hot temperature region H''' and a moderate temperature region M'''.

The auxiliary coolant portion 126"" of the moderate temperature cooling subsystem 104"" is connected via a first section 130*a* of the auxiliary coolant piping section 130"" which connects to an input of the shared coolant pump 300 to thereby provide its circulation. The shared coolant pump 300 may be electrically driven, or supplementally electrically driven, to provide circulation of the auxiliary coolant portion 126"" when the engine 108' is off. In this regard, an output of the shared coolant pump 300 connects, via a second section 130*b* of the auxiliary coolant piping 130"", through a known form of flow regulator 302, to the inlet tank 118'''. The flow regulator 302 provides flow rate regulation of the auxiliary coolant portion 126"" appropriate for the moderate temperature coolant subsystem, in that the shared coolant pump is simultaneously pumping both portions of the shared coolant 122"". The engine coolant portion 124"" of the high temperature cooling subsystem 102"" is connected via a section 128*a* of the engine coolant piping 128"" to another input of the shared coolant pump 300, which provides its circulation.

Benefits of the integrated cooling system 100 according to the present invention, include: elimination of the need for a separate moderate temperature cooling system coolant reservoir and filler cap thereof, thereby reducing cost burden, mass, and packaging space; elimination of additional assembly plant evacuation and coolant fill operations; elimination of need for a separate heat exchanger for the moderate temperature coolant subsystem in the CRFM, thereby reducing its cost and mass, as well as reducing the fore-aft thickness of CRFM; elimination of need for a specific air separator or service vent valves in the moderate temperature cooling subsystem, thereby reducing cost burden, mass, and packaging space; providing cooling for the moderate temperature cooling subsystem while the engine thermostat is closed (unlike prior art mild-hybrid inverter cooling loops, which are simply plumbed out of, and back into, the engine heat exchanger outlet hose), whereby the moderate temperature cooling subsystem can operate 10° C. cooler (versus simply plumbing the moderate temperature cooling subsystem in parallel with the engine and the engine heat exchanger); and isolation of the moderate temperature cooling subsystem from temperature spikes of the high temperature cooling subsystem, which spikes may occur during engine restarts after hot soaks, and which, if otherwise present, would pose potential toleration problems for power electronics cooled by the moderate temperature cooling subsystem.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. An integrated cooling system for a motor vehicle, comprising:
 a shared heat exchanger comprising:
  an engine heat exchanger comprising a first inlet, a first outlet and a plurality of engine coolant passages communicating between said first inlet and said first outlet; and
  an auxiliary heat exchanger comprising a second inlet, a second outlet and a plurality of auxiliary coolant passages communicating between said second inlet and said second outlet;
 a high temperature cooling subsystem;
 a moderate temperature cooling subsystem;
 a shared coolant comprising an engine coolant portion and an auxiliary coolant portion;
 an inlet tank connected to said first and second inlets, said inlet tank having a baffle separating said first inlet with respect to said second inlet such that all of said engine coolant portion flows through said engine coolant passages and all of said auxiliary coolant portion flows through said auxiliary coolant passages;
 an outlet tank connected to said first and second outlets, wherein said first and second outlets freely fluidically communicate with each other;
 a shared coolant reservoir;
 piping fluidically connecting said shared coolant with each of said at least shared coolant reservoir, said high temperature cooling subsystem, said moderate temperature cooling subsystem, and said at least one heat exchanger, wherein said plurality of engine coolant passages are connected by said piping to said high temperature cooling subsystem, and wherein said plurality of auxiliary coolant passages are connected by said piping to said moderate temperature cooling subsystem; and
 an air separator connected with said piping at said moderate temperature cooling subsystem; wherein said piping further connects said shared coolant reservoir to said air separator;
 wherein said shared coolant is stratified by said baffle at said inlet tank and by coolant flow through said outlet tank so as to thereby substantially retain thermal identity as between the engine coolant portion and the auxiliary coolant portion thereof; and
 wherein the engine coolant portion of said shared coolant is utilized in said hot temperature cooling subsystem, and wherein the auxiliary coolant portion of said shared coolant is utilized in said moderate temperature cooling subsystem.

2. An integrated cooling system for a motor vehicle, comprising:
 a shared heat exchanger comprising:
  an engine heat exchanger comprising a first inlet, a first outlet and a plurality of engine coolant passages communicating between said first inlet and said first outlet; and
  an auxiliary heat exchanger comprising a second inlet, a second outlet and a plurality of auxiliary coolant passages communicating between said second inlet and said second outlet;
 a high temperature cooling subsystem;
 a moderate temperature cooling subsystem;
 a shared coolant comprising an engine coolant portion and an auxiliary coolant portion;
 an inlet tank connected to said first and second inlets, said inlet tank having a baffle separating said first inlet with respect to said second inlet such that all of said engine coolant portion flows through said engine coolant passages and all of said auxiliary coolant portion flows through said auxiliary coolant passages;
 an outlet tank connected to said first and second outlets, wherein said first and second outlets freely fluidically communicate with each other;
 a shared coolant reservoir; and
 piping fluidically connecting said shared coolant with each of said at least shared coolant reservoir, said high temperature cooling subsystem, said moderate temperature cooling subsystem, and said at least one heat exchanger, wherein said plurality of engine coolant passages are connected by said piping to said high temperature cooling subsystem, wherein said plurality of auxiliary coolant passages are connected by said piping to said moderate temperature cooling subsystem, and wherein said piping connects said shared coolant reservoir to said shared heat exchanger at said outlet tank;
 wherein said shared coolant is stratified by said baffle at said inlet tank and by coolant flow through said outlet tank so as to thereby substantially retain thermal identity as between the engine coolant portion and the auxiliary coolant portion thereof; and
 wherein the engine coolant portion of said shared coolant is utilized in said hot temperature cooling subsystem, and wherein the auxiliary coolant portion of said shared coolant is utilized in said moderate temperature cooling subsystem.

3. The integrated cooling system of claim 2, further comprising an air separator connected with said piping at said moderate temperature cooling subsystem; wherein said piping further connects said shared coolant reservoir to said air separator.

4. The integrated cooling system of claim 2, wherein said high and moderate temperature cooling subsystems further comprise:
 a shared coolant pump connected with said piping so as to circulate both said engine coolant portion and said auxiliary coolant portion; and
 a flow regulator connected to said moderate temperature cooling subsystem.

5. An integrated cooling system for a motor vehicle, comprising:
 an engine heat exchanger comprising a first inlet, a first outlet and a plurality of engine coolant passages communicating between said first inlet and said first outlet;
 an auxiliary heat exchanger comprising a second inlet, a second outlet and a plurality of auxiliary coolant passages communicating between said second inlet and said second outlet;
 a high temperature cooling subsystem;

an internal combustion engine connected with said high temperature cooling system so as to provide cooling thereof;

a moderate temperature cooling subsystem;

at least one auxiliary vehicle component connected with said moderate temperature cooling system so as to provide cooling thereof;

a shared coolant comprising an engine coolant portion and an auxiliary coolant portion;

an air separator;

a shared coolant reservoir; and piping fluidically connecting said shared coolant with each of said shared coolant reservoir, said high temperature cooling subsystem, said moderate temperature cooling subsystem, and said engine and auxiliary heat exchangers, wherein:

said air separator is connected by said piping to said moderate temperature cooling subsystem between said second outlet of said auxiliary heat exchanger and said at least one auxiliary vehicle component;

said piping connects said shared coolant reservoir to said air separator and connects said shared coolant reservoir to said first outlet of said engine heat exchanger; and said piping shares the shared coolant through said air separator and said coolant reservoir;

wherein said shared coolant is stratified by said at least one heat exchanger so as to thereby retain thermal identity as between the engine coolant portion and the auxiliary coolant portion thereof; and wherein the engine coolant portion of said shared coolant is utilized in said hot temperature cooling subsystem to cool said internal combustion engine, and wherein the auxiliary coolant portion of said shared coolant is utilized in said moderate temperature cooling subsystem to cool said at least one auxiliary vehicle component.

* * * * *